United States Patent [19]

Fukuda et al.

[11] Patent Number: 5,883,156
[45] Date of Patent: Mar. 16, 1999

[54] BIODEGRADABLE RESIN COMPOSITION ADN ANTIFOULING PAINT COMPOSITION

[75] Inventors: Koichi Fukuda, Osaka; Junji Yokoi, Ikoma, both of Japan

[73] Assignee: Nippon Paint Co., Ltd., Osaka, Japan

[21] Appl. No.: 833,010

[22] Filed: Apr. 4, 1997

Related U.S. Application Data

[63] Continuation-in-part of Ser. No. 668,973, Jun. 24, 1996, abandoned, which is a continuation of Ser. No. 291,451, Aug. 16, 1994, abandoned.

[30] Foreign Application Priority Data

Aug. 20, 1993 [JP] Japan ..................... 5-206033

[51] Int. Cl.$^6$ .............. C08J 3/00; C08K 3/00; C08L 29/04; C08F 24/00
[52] U.S. Cl. ............ 523/122; 424/78.09; 524/5; 525/58; 525/74; 526/266; 528/354
[58] Field of Search .................... 424/78.09; 525/58, 525/74; 523/122; 526/266; 528/354; 524/5

[56] References Cited

U.S. PATENT DOCUMENTS

| | | | |
|---|---|---|---|
| 4,500,339 | 2/1985 | Young et al. | 71/67 |
| 5,115,025 | 5/1992 | Koleske et al. | 525/162 |

FOREIGN PATENT DOCUMENTS

| | | |
|---|---|---|
| 117538 | 9/1984 | European Pat. Off. . |
| 260799 | 3/1988 | European Pat. Off. . |

OTHER PUBLICATIONS

S. Rimmer, M.H. George, Synthesis of Graft Copolymers Of Poly(Caprolactone) And Poly(methyl methacrylate) And The Use Of These Materials To Synthesize Soft–Segment Grafted Polyurethanes, Feb. 1993, Eur. Polymer J., vol. 29 No. 2/3, pp. 205–210.

*Primary Examiner*—Patrick D. Niland
*Attorney, Agent, or Firm*—Townsend & Banta

[57] ABSTRACT

An antifouling paint composition comprising a binder resin composition containing a biodegradable resin being obtained by polymerizing a cyclic lactone compound with at least two active hydrogen groups of a compound containing at least two active hydrogen groups in one molecule, and an antifouling additive being mixed with the binder resin composition in a weight ratio of the binder resin composition to the antifouling additive from 1:2 to 7:1, the binder resin composition having a gel fraction of not more than 5% by weight.

7 Claims, No Drawings

BIODEGRADABLE RESIN COMPOSITION ADN ANTIFOULING PAINT COMPOSITION

This application is a continuation in part of application Ser. No. 08/668,973 filed Jun. 24, 1996, now abandoned which is a continuation of application Ser. No. 08/291,451 filed Aug. 16, 1994, now abandoned.

BACKGROUND OF THE INVENTION

1. Field of the Invention

The present invention relates to an antifouling paint composition which is employed for preventing a marine structure or the like from damage caused by fouling aquatic organisms.

2. Description of the Background Art

A marine structure such as ship's bottoms, port installations, buoys, pipelines, bridges, submarine bases, aquaculture nets, fixed shore nets, installations related to submarine oil fields, conducting tubes or intake works of power stations, breakwaters or ship anchors are fouled by fouling aquatic organisms such as barna-cles, shellfish, bryozoan, algae and the like, leading to significant economic loss.

In order to prevent settlement of such fouling aquatic organisms, the marine structure is generally coated with an antifouling paint, which is mainly prepared from an antifoulant of an inorganic copper compound, an organic tin compound or the like. An antifouling paint contains rosin as a part of its paint binder, and the antifoulant is blended with the same, in order to prevent settlement of fouling aquatic organisms.

On the other hand, known is a hydrolytic antifouling paint which contains an antifouling component of a trialkyl tin polymer. This paint is so prepared that the trialkyl tin polymer is hydrolyzed in an underwater alkalescent atmosphere to elute an organic tin compound, while the paint binder is dissolved in water to elute the antifoulant as blended (refer to GB2084167, for example).

The antifoulant components eluted in such a manner have high toxicity and exhibit antifouling performance by killing or damaging the fouling aquatic organisms to be kept from settlement. Every one of the conventional antifouling paints contains a compound which is toxic for organisms including humans as hereinabove described, and hence the same is problematic in safety for operators. This is a serious problem in consideration of marine pollution, which has recently came into the spotlight.

In recent years, there have been proposed a number of silicone antifouling paints (refer to Japanese Patent Publication No. 63-2995 (1988), for example). Such a silicone antifouling paint utilizes water repellency and low surface free energy of a painted surface. However, the silicone antifouling paint has problems of imperfect adhesion to a coating substrate, insufficient strength of a paint film and difficulty in recoating and repair coating, although the same has low toxicity to the human body and a small degree of environmental pollution. Thus, the silicone antifouling paint is employed merely in a specific region of a nuclear power station, for example.

Under the present circumstances, it is extremely difficult to attain an antifouling function without employment of antifoulant. It is conceivably preferable to employ a hydrolytic binder, which can substantially reduce the amount of the antifoulant. In Japanese Patent Laying-Open Nos. 3-35065 (1991) and 62-13471 (1987), however, it is difficult to control hydrolyzability due to employment of an extremely hydrolyzable organosilyl group for serving as a hydrolytic group. In U.S. Pat. Nos. 5080892 and 4918147, the color tone is remarkably restricted since a binder itself contains a heavy metal while the same is a colored binder derived from metal ions.

On the other hand, biodegradable resin is recently watched with interest and various products employing the same have been proposed (refer to WO/92/21708, Japanese Patent Laying-Open No. 3-157450 (1991) and U.S. Pat. No. 5191037, for example). Biodegradation is conceivably caused by hydrolysis resulting from the function of external enzyme secreted by microorganisms.

An antifouling paint composition disclosed in Japanese Patent Laying-Open No. 4-120163 (1992) is known as a paint composition employing such a biodegradable resin binder. However, the biodegradable binder proposed in this gazette is not stably dissolved in a general purpose organic solvent for a paint such as xylene or toluene for a long time, and hence problematic in practical application. Further, the binder requires a specific synthesizing installation due to requirement for polycondensation reaction under decompressed and high-temperature conditions, as well as long-time reaction, leading to an economic problem to be solved.

SUMMARY OF THE INVENTION

An object of the present invention is to provide an antifouling paint employing a biodegradable resin having excellent biodegradability with solubility in a general purpose organic solvent.

The present invention is directed to an antifouling paint employing a biodegradable resin which is obtained by graft-polymerizing a compound containing at least two active hydrogen groups in one molecule by a cyclic lactone compound.

The compound employed in the present invention contains at least two active hydrogen groups in one molecule. These active hydrogen groups serve as reaction sites to start ring-opening polymerization with addition of the cyclic lactone compound so that a comb-type graft polymer is obtained by grafting caused by ring-opening polymerization of the cyclic lactone compound with the compound containing active hydrogen groups.

<Compounds Containing Active Hydrogen Groups>

The compounds containing active hydrogen groups can be prepared from saccharides, polyamino acids, glycerine or its derivatives, polymers of ethylenic unsaturated monomers, or polyvinyl alcohols, for example.

[Saccharides]

Examples of polysaccharides are cellulose and its derivatives such as methyl cellulose, hydroxypropyl cellulose, hydroxypropyl methyl cellulose, hydroxyethyl cellulose and carboxymethyl cellulose, chitin derivatives such as chitosan; agarose (agar) and its derivatives including hydrolysate, graft polymer and alkylene oxide adduct; starch and its derivatives including hydrolysates, graft polymers and alkylene oxide adducts; mucopolysaccharides such as heparin, hyaluronic acid or chondroitin sulfuric acid; glycogen; disaccharides such as cane sugar (sugar), maltose, lactose (milk sugar) and isomaltose; and oligosaccharides such as trisaccharide. In consideration of graft polymerization reaction with the cyclic lactone compound, particularly preferable is polysaccharides having a malting point, or polysaccharides which are soluble in the cyclic lactone compound and/or a solvent.

Examples of monosaccharides are furanose, glucose, galactose, mannose, (cyclo)dextrin, sorbitol and fructose; its graft polymer with ethylenic unsaturated monomers such as acrylic monomers of such monosaccharides; its alkyl esters with stearic acid or the like; its urethane polymer with isocyanates; denatured compounds with alkylene oxides such as ethylene oxide or propylene oxide.

Additional saccharides may be prepared from glycoside compounds such as a drug containing sugar chains in one molecule such as antibiotics, or pigments containing sugar chains in one molecule such as anthocyanin, glycolipid, or glycoprotein.

[Polyamino Acids]

Examples of the polyamino acids are copolyamino acids consisting of amino acid monomers expressed in a general formula $H_2N$—CHR—COOH, where R represents aminoalkyl groups, guanidinealkyl groups, imidazolealkyl groups, mercaptoalkyl groups, carboxylalkyl groups, hydroxybenzil groups, indolalkyl groups, hydroxyalkyl groups, benzil groups or alkyl groups, specifically, α-amino acids such as lysine, glutamic acid, arginine, serine, tyrosine, cysteine, hydroxyphenylalanine and the like; homopolyamino acids such as ε-polylysine, γ-polylysine and γ-polyglutamic acid; and proteins such as gelatin.

[Glycerine and Glycerine Derivatives]

Examples of the glycerine and its derivatives are monoglycerides and diglycerides of glycerine and natural fatty acids having carbon numbers of 12 to 24 such as saturated fatty acids such as lauric acid, myristic acid, palmitic acid, stearic acid, arachidic acid, behenic acid and lignoceric acid, and unsaturated fatty acid such as palmitoleic acid, oleic acid, linolic acid, linolenic acid, and arachidonic acid.

[Polyvinyl Alcohols]

The polyvinyl alcohols are preferably prepared from those having a small degree of polymerization and a high degree of saponification, in consideration of biodegradability. Exemplary polyvinyl alcohols are not more than 1000 in degree of polymerization and at least 50 in degree of saponification. Further, the polyvinyl alcohols whose adjacent hydroxy groups are partially etherelized by dehydration condensation may be employed.

[Polymers of Ethylenic Unsaturated Monomers]

The polymers of ethylenic unsaturated monomers can be prepared from acrylic resin, for example.

The acrylic resin is obtained by radical-polymerizing acrylic monomer with another copolymerizable monomer in an organic solvent by a well-known technique. The acrylic monomer can be prepared from methyl (meth)acrylate, ethyl (meth)acrylate, n-butyl (meth)acrylate, i-butyl (meth) acrylate, t-butyl (meth)acrylate, 2-ethylhexyl (meth) acrylate, lauryl (meth)acrylate, phenyl (meth)acrylate, benzil (meth)acrylate, 2-hydroxyethyl (meth)acrylate, 2-hydroxypropyl (meth)acrylate, 4-hydroxypropyl (meth) acrylate, an adduct of 2-hydroxyethyl (meth)acrylate and ε-caprolactone such as PLACCEL FM1 by Daicel Chemical Industries, Ltd., for example, (meth)acrylic acid, sulfonate 2-(meth)acrylamide-2-methylpropane, (meth)acrylonitrile, (meth)acrolein, N,N-dimethyl(meth)acrylamide, N,N-dimethylaminoethyl (meth)acrylate, diethylaminoethyl (meth)acrylate, N-t-butylaminoethyl (meth)acrylate, acid phosphoxypropyl (meth)acrylate, glycidyl (meth)acrylate, 3-trimethoxysilylpropyl (meth)acrylate, 3-triethoxysilylpropyl (meth)acrylate, dimethoxymethylsilylpropyl (meth)acrylate, and (meth)acrylamide. The copolymerizable monomer is prepared from α, β unsaturated vinyl monomers other than acrylic monomers, such as styrene, α-methylstyrene, vinyl toluene, allyl glycidyl ether, itaconic acid, anhydrous itaconic acid, maleic acid, anhydrous maleic acid, vinyl acetate, allyl acetate, allylamine, 1-vinyl-pyrolidone, vinyl trimethoxysilane or vinyl triethoxysilane. The content of such a copolymer component is preferably not more than 50 percent by weight of the overall monomer including the acrylic monomer.

The organic solvent employable in polymerization of the acrylic monomer is prepared from ester solvent of ethyl acetate, butyl acetate or isobutyl acetate, aromatic hydrocarbon solvent of xylene or toluene, ketone solvent of methyl isobutyl ketone or methyl ethyl ketone, alcohol solvent of isopropyl alcohol or n-butanol, polar solvent containing no active hydrogen groups in its molecules such as tetrahydrofuran, N,N-dimethylformamide, dimethylsulfoxide or N-methylpyrrolidone, or a mixture of two or more such solvents.

A radical polymerization initiator is prepared from that employed in ordinary radical polymerization such as azo polymerization initiator such as azobisisobutyronitrile, 2,2'-azobis(2,4-dimethylvaleronitrile), 2,2'-azobis(2-amidinopropane) hydrodichloride, 4,4'-azobis(4-cyanovaleric acid), 2,2'-azobis[2-(5-methyl-2-imidazoline-2-yl)propane] hydrodichloride, 2,2'-azobis{2-methyl-N-[,1, 1-bis(hydroxymethyl)-2-hydroxyethyl] propionamide} or 2,2'-azobisisobutylamide dihydrate or peroxide polymerization initiator such as benzoyl peroxide, lauroyl peroxide, t-butyl peroxy-2-ethyl hexanoate or cumene hydroperoxide, for example.

The aforementioned polymerization reaction can be generally made under a temperature of about 60° to 18020 C., preferably 90° to 120° C., to be completed in 2 to 10 hours, generally in about 3 to 6 hours, under such a condition.

The average molecular weight of the ethylenio unsaturated polymer as obtained is preferably within the range of 800 to 1,000,000. In order to attain the molecular weight of this range, the amount of the radical polymerization initiator may be adjusted, mercapto compound chain transfer agents such as t-dodecanethiol, 2-ethylhexyl thioglycolate, thiobenzoic acid or thioethanol may be employed, allyl compounds such as allyl alcohol may be employed, or aromatic chain transfer agents such as 2,4-diphenyl-4-methyl-1-pentene (α-methylstyrene dimer) may be employed, for example. Such acrylic polymer has one or at least two carboxyl, hydroxyl and/or amino groups, as active hydrogen groups having graft polymerization reactivity with the cyclic lactone compound.

The average molecular weight of the acrylic resin employed in the present invention is preferably 800 to 1,000,000, more preferably 1,000 to 500,000. If the average molecular weight is too low, the acrylic resin may contain no active hydrogen groups in its molecules. If the average molecular weight is too high, on the other hand, paint workability is extremely reduced. The term "average molecular weight" employed in this specification indicates a value which is obtained by GPC (gel permeation chromatography) in terms of polystyrene.

[Other Compounds Containing Active Hydrogen Groups]

A compound containing active hydrogen groups other than the above may also be prepared from polyurethane resin such as copolymer of a polyol compound and polyisocyanate compound, polyester resin such as microbially derived and chemically synthesized poly (hydroxyalkanoate), such as hydroxybutylate/valerate copolyester resin, polylactic acid resin, polyglycolic acid resin, lactic acid/glycolic acid copolyester resin, polycaprolactone or alternating copolymer of aliphatic diol compounds and aliphatic dicarboxylic acid compounds, polyamide resin such as nylon resin such as nylon 6, nylon 66, nylon 610, nylon 612, nylon 11 or nylon 12, polyether resin such as polyethylene glycol, polypropylene glycol or polybutylene ether, polycarbonate resin such as polyethylene carbonate, polymethylene carbonate, polybutylene carbonate or poly(2,2-dimethyltrimethylene carbonate, polydiorganosiloxane such as polydimethylsiloxane containing hydroxyl groups, polydimethylsiloxane containing amino groups, polydimethylsiloxane containing mercapto groups, polydimethylsiloxane containing carboxyl groups or polymethylhydrogensiloxane, or natural rubbers.

<Cyclic Lactone Compounds>

The cyclic lactone compound employed in the present invention can be prepared from that expressed in the following general formula (I) or (II):

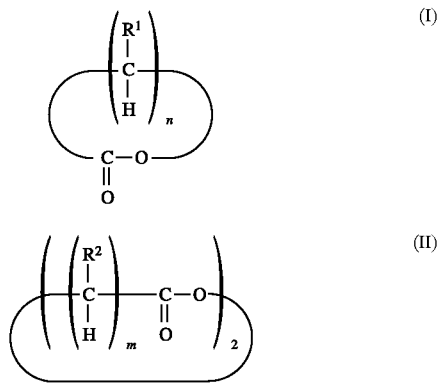

where n represents an integer of 2 to 12, m represents 1 or 2, and $R^1$ and $R^2$ represent hydrogen atoms, methyl groups or ethyl groups.

Examples of the cyclic lactone compounds are β-propiolactone, γ-butyrolactone, δ-valerolactone, ε-caprolactone, ω-caprylolactone, ω-caprynolactone, ω-laurolactone, glycolides which are cyclic dimers of glycolic acid, and lactides which are cyclic dimers of lactic acid. Further, cyclic lactone compounds having alkyl side chains of methyl groups and ethyl groups such as β-butyrolactone, γ-valerolactone, γ-caprolactone, or δ-caprolactone are also employable.

<Graft Polymerization>

The biodegradable resin according to the present invention, which is a composition obtained by polymerizing the aforementioned compound containing active hydrogen groups by the cyclic lactone compound in a ring-opening manner, may contain unreacted compound containing active hydrogen groups or unreacted cyclic lactone compound, for example. After completion of the polymerization reaction, therefore, the inventive biodegradable resin can be brought into a form which is responsive to the object of employment as such or through addition or removal of solvent.

The polymerization is made by a well-known technique. For example, a mixture of compound containing active hydrogen groups selected from the group consisting of saccharides, polyamino acids, glycerine and its derivatives, polymers of ethylenic unsaturated monomers, and polyvinyl alcohols, cyclic lactone compounds and polymerization catalyst with inactive solvent being added at need is heated and stirred with supply of nitrogen gas and subjected to graft polymerization reaction for a prescribed period, to obtain a biodegradable resin.

[Graft Polymerization Ratio]

In synthesis of the biodegradable resin, the weight compounding ratio of the compound containing active hydrogen groups to the cyclic lactone compound is preferably within the range of 0.01/100 to 200/100, more preferably in the range of 0.1/100 to 100/100, in particular. If the weight ratio of the compound containing active hydrogen groups to the cyclic lactone compound is out of the range of 0.01/100 to 200/100, neither mechanical strength for serving as resin nor solubility in organic solvent is obtained, while biodegradability for serving as a biodegradable composition is extremely reduced in addition if the ratio exceeds 200/100.

[Graft Polymerization Catalysts]

The polymerization catalyst can be prepared from a known compound such as organic tin compounds such as dibutyl tin dilaurate, dilauryl tin oxide, butyl tin tri-2-ethyl hexanoate and dibutyl tin methoxide, organic titanium compounds such as tetraisopropyl titanate, tetrabutyl titanate and tetrakis(2-ethylhexyl) titanate, Lewis acid compounds such as antimony compounds such as antimony trifluoride, antimony trichloride or antimony trisulfide or molybdenum compounds, alkyl metals such as lithium hydroxide and butylated lithium, and rare earth metal complex compounds, but is not restricted to these.

<Gel Fraction>

A binder resin composition containing the biodegradable resin according to the present invention has a gel fraction of not more than 5% by weight.

Antifouling Paint Composition

The inventive antifouling paint composition is prepared by employing a binder resin composition containing the aforementioned inventive biodegradable resin.

The binder resin composition may contain the other resin such as acrylic resins, polyester resins, polyamide resins, silicone resins, polyether resins or polyvinyl resins in the degree not damaging antifouling performance of the antifouling paint composition, in order to improve physical properties of the paint film etc.

Further, the binder resin composition also may contain a crosslinking agent such as polyisocyanate compounds, as far as its gel fraction is not more than 5% by weight. Examples of the crosslinking agent are hexamethylene diisocyanate and toluene diisocyanate; dibasic acid anhydrides and resins containing dibasic acid anhydrides such as anhydrous polymaleic acid, styrene/anhydrous maleic acid copolymer and anhydrous pyromellitic acid; melamine formaldehyde resin; or polyepoxy compounds.

[Antifouling Additive]

The inventive antifouling paint composition further comprises an antifouling additive in a weight ratio of the binder resin composition to the antifouling additive from 1:2 to 7:1.

The antifouling additive can be prepared from chemicals which are generally employed for antifouling paints, such as zinc dimethyldithiocarbamate, 2-methylthio-4-t-butylamino-6-cyclopropylamino-s-triazine, 2,4,5,6-tetrachloroisophthalonitrile, N,N-dimethyl dichlorophenylurea, copper rhodanide, copper suboxides, 4,5-dichloro-2-n-octyl-3(2H)isothiazoline, N-(fluorodichloromethylthio)phthalimide, N,N'-dimethyl-N'-phenyl-(N-fluorodichloromethylthio)sulfamide, 2-pyridinethiol-1-oxide zinc salt (zinc pyrithione), 2,4,5,6-tetrachloro-4-(methylsulfonyl)pyridine, 3-iodo-2-propynylbutylcarbamate, and diiodomethylparathorylsulfone or the like. The additive can also be prepared from surface active agent (combination of one or at least two elements selected from anion, cation and nonion systems), algicides, pesticides, antibiotics, enzyme activity inhibitors such as alkylphenol or alkylresorcinol, or compounds other than the above having relatively mild toxicity. The additive can be introduced in an arbitrary amount but its content is preferably about 50 percent by weight at the maximum so that strength of the paint film is not reduced and biodegradability is not inhibited unless the additive is introduced in a safe antifouling amount, while the lower limit of the amount is preferably minimized in consideration of environmental pollution.

[Other Additives]

The inventive antifouling paint composition can be further properly blended with plasticizer, rheology modifier such as antisagging agent or thickening agent, color pigment such as titanium oxide, red oxide or organic dye, chemicals allowed by Japanese Food Sanitation Law such as preservatives, fungicides, antioxidants, bactericides or aromatics, for example, ultraviolet absorbants, extender pigments such as clay, alumina, silica and talc, and surface modifier such as paraffin and silicone oil.

[Content of Biodegradable Resin]

The inventive antifouling paint composition contains 10 to 95 percent by weight, preferably 30 to 70 percent by weight in particular, of the aforementioned biodegradable resin as vehicle component. If the amount of the biodegradable resin is too small, the composition cannot serve as paint binder or has only a short antifouling period. If the amount of the biodegradable resin is too large, on the other hand, it is impossible to prepare antifouling paint composition which is practically employable for a long time.

[Coating Means and Coated Substance]

A method of forming a paint film by the inventive antifouling paint composition is not particularly restricted but a method similar to that for a conventional antifouling paint is employable. For example, it is possible to directly apply the inventive antifouling paint composition to the surface of a base material such as marine structures such as ship's bottoms, port installations, buoys, pipelines, bridges, submarine bases, aquaculture nets, fixed shore nets, installations related to submarine oil fields, conducting tubes or intake works of power stations, breakwaters or ship anchors, for example, or to apply the same to the surface of a base material provided with a coated film which is formed by combining and applying a primer such as wash primer or zinc epoxy primer, primer such as oil rust inhibitors or chlorinated rubber or epoxy primer and an intermediate or finish coat of long oil phthalate resin, chlorinated rubber or epoxy, or by successively applying primer, intermediate coat and finish coat, by brush painting, spray painting, roller painting, electrostatic painting or dipping. The amount of application can be in the range of 5 to 500 μm, preferably 10 to 300 μm, as a thickness after drying, in general. The paint film can be dried under a room temperature condition, while the same can also be dried under a heated condition or a temperature below the room temperature, as the case may be.

The biodegradable resin according to the present invention is obtained by graft-polymerizing the compound containing active hydrogen groups by the cyclic lactone compound. Therefore, a polymer chain portion formed by ring-opening polymerization of the cyclic lactone compound can be readily microbiochemically and chemically hydrolyzed. Thus, the inventive biodegradable resin has excellent degradability in the applied environment.

Further, the inventive biodegradable resin is soluble in a general-purpose organic solvent such as toluene, xylene, butyl acetate, methyl isobutyl ketone or n-butyl alcohol.

The inventive antifouling paint composition employs the aforementioned inventive biodegradable resin as binder.

Thus, the paint composition is soluble in general-purpose organic solvent such as toluene, xylene, butyl acetate, methyl isobutyl ketone or n-butyl alcohol, and is gradually decomposed from the surface of the paint film as formed by biodegradation, hydrolytic reaction etc. and consumed while releasing the antifouling additive etc. Thus, it is possible to prevent a submerged object such as ship's bottoms from fouling of aquatic organisms or the like, by applying the inventive antifouling paint composition thereto.

The foregoing and other objects, features, aspects and advantages of the present invention will become more apparent from the following detailed description of the present invention.

DESCRIPTION OF THE PREFERRED EMBODIMENTS

Examples of the present invention are now described. Throughout the specification, parts and percent are those by weight, unless otherwise stated. The present invention is not restricted to the following Examples.

[Preparation of Biodegradable resin]

PREPARATION EXAMPLE 1

195 parts of ε-caprolactone, 5 parts of glycerine, and 0.16 parts of an organic tin compound (FASCAT 4102 (trade name) by M & T Chemicals Inc.) for serving as a catalyst were introduced into a separable flask of 500 ml in volume comprising a stirrer and a nitrogen jet feeder, and brought into reaction at 180° C. with continuation of stirring and nitrogen gas feeding, until disappearance of IR spectral absorption derived from ε-caprolactone. The mixture was stood to cool after completion of the reaction, and collected with further addition of 200 parts of toluene. The toluene solution as collected contained 50.5 percent of nonvolatile matter, which was measured in a high vacuum oven at 120° C. for 3 hours under a pressure of not more than 1 mmHg. The average molecular weight in terms of polystyrene, which was measured by gel permeation chromatography (hereinafter simply referred to as GPC), was about 9000.

PREPARATION EXAMPLES 2 to 5

Reaction was made similarly to Preparation Example 1 except that glycerine was replaced by hydroxypropyl cellulose fine powder (HPC-L by Nippon Soda Co., Ltd.) and compounding ratios of ε-caprolactone and hydroxypropyl cellulose fine powder (HPC) were changed as shown in Table 1, to obtain biodegradable resins.

Table 1 also shows results of Preparation Example 1.

TABLE 1

| Preparation Example | ε-Caprolactone | Compound Containing Active Hydrogen | Non-Volatile Matter | GPC Average Molecular Weight |
|---|---|---|---|---|
| 1 | 195 parts | 5 parts of Glycerine | 50.5% | about 9,000 |
| 2 | 197.5 parts | 2.5 parts of HPC | 49.2% | about 563,000 |
| 3 | 175 parts | 25 parts of HPC | 49.7% | about 383,000 |
| 4 | 150 parts | 50 parts of HPC | 50.2% | about 269,000 |
| 5 | 100 parts | 100 parts of HPC | 49.8% | about 212,000 |

PREPARATION EXAMPLES 6 to 13

Polymerization reaction was made similarly to Preparation Example 1 except that compounding ratios were as shown in Table 2 and amounts of toluene added after completion of the reaction were changed to 150 parts, to obtain biodegradable resins.

In each of Preparation Examples 12 and 13, 0.12 parts of tetrabutyl titanate was employed as a catalyst, in place of FASCAT 4102. Referring to Table 2, Poval 403 (trade name by Kuraray Co., Ltd.) is polyvinyl alcohol of 300 in degree of polymerization and 90 in degree of saponification, and Poval 203 (trade name by Kuraray Co., Ltd.) is polyvinyl alcohol of 300 in degree of polymerization and 80 in degree of saponification.

TABLE 2

| Preparation Example | ε-Caprolactone | Compound Containing Active Hydrogen | Non-Volatile Matter | GPC Aberage Molecular weight |
|---|---|---|---|---|
| 6 | 142.5 parts | 7.5 parts of Glycerine | 49.9% | about 9,000 |
| 7 | 135.0 parts | 15.0 parts of Soluble Starch | 50.2% | about 230,000 |
| 8 | 120.0 parts | 30.0 parts of Agarose | 48.7% | about 320,000 |
| 9 | 100.0 parts | 50.0 parts of Chitosan | 50.0% | about 260,000 |
| 10 | 148.1 parts | 1.88 parts of Glycerine | 50.3% | about 150,000 |
| 11 | 149.1 parts | 0.94 parts of ε-Polylysine | 49.5% | about 270,000 |
| 12 | 142.5 parts | 15 parts of Poval 403 | 49.7% | about 210,000 |
| 13 | 142.5 parts | 15 parts of Poval 203 | 49.5% | about 230,000 |

PREPARATION EXAMPLE 14

200 parts of xylene was introduced into a separable flask of 500 ml in volume comprising a stirrer and a nitrogen gas feeder, and heated to a temperature of 120° C. with continuation of stirring and nitrogen feeding. A mixture of 20 parts of N,N-dimethyl methacrylamide, 30 parts of hydroxyethyl methacrylate, 114 parts of ethyl acrylate, 30 parts of methyl methacrylate, 6 parts of 2-ethylhexyl thioglycolate and 5 parts of azobisisobutyronitrile (AIBN), which was introduced into a dropping funnel, was dropped into the separable flask over 2 hours, and reaction was continued further for 3 hours, to obtain an acrylic resin solution. The xylene solution as collected contained 49.3 percent of non-volatile matter, which was measured in a high vacuum oven at 120° C. for 3 hours under a pressure of not more than 1 mmHg. The average molecular weight in terms of polystyrene, which was measured by GPC, was about 13,000.

50 parts of the acrylic resin solution obtained in the aforementioned manner, 175 parts ε-caprolactone, and 0.08 parts of dibutyl tin diacetate for serving as a catalyst were introduced into a separable flask of 500 ml in volume comprising a stirrer and a nitrogen gas feeder, and brought into reaction at a temperature of 180° C. with continuation of stirring and nitrogen gas feeding until disappearance of IR spectral absorption derived from ε-caprolactone. After completion of the reaction, the mixture was stood to cool, and collected with further addition of 195 parts of toluene. The toluene solution as collected contained 50.3 percent of non-volatile matter, which was measured in a high vacuum oven at 120° C. for 3 hours under a pressure of not more than 1 mmHg. The average molecular weight in terms of polystyrene, which was measured by GPC, was about 170,000.

[evaluation of Antifouling Paint]

EXAMPLE 1

80 parts of the resin composition obtained in Preparation Example 1, 10 parts of p-nonylphenol, 10 parts of cetylpyridine chloride, 1 part of Coronate HX, 35 parts of xylene, and 15 parts of titanium oxide were sufficiently mixed with each other by a homogenizer, to prepare an antifouling paint composition. "Coronate HX" is a polyisocyanate compound as a crosslinking agent (nonvolatile content: 75%, by Nippon Polyurethane Industry Co., Ltd.). The paint composition was applied onto a steel plate coated with a commercially available vinyl tar anticorrosive paint so that its thickness was 100 to 150 μm in average after drying, and dried for 3 days under room temperature conditions, thereby forming a paint film.

EXAMPLE 2

A paint film was formed similarly to Example 1, except that the resin composition employed in Example 1 was replaced by that obtained in Preparation Example 2.

EXAMPLE 3

80 parts of the resin composition obtained in Preparation Example 3, 20 parts of 3-iodo-2-propynylbutylcarbamate, 15 parts of red oxide, and 35 parts of xylene were sufficiently mixed with each other by a homogenizer, to prepare an antifouling paint composition. This composition was applied onto a steel plate coated with a commercially available vinyl tar anticorrosive paint so that its thickness was 100 to 150 μm after drying, and dried for 3 days under room temperature conditions, thereby forming a paint film.

EXAMPLE 4

60 parts of the resin composition obtained in Preparation Example 4, 5 parts of 3-iodo-2-propynylbutylcarbamate, 15 parts of N,N-dimethyldichlorophenylurea, and 20 parts of xylene were sufficiently mixed with each other by a homogenizer, to prepare an antifouling paint composition. This composition was applied onto a steel plate coated with a commercially available vinyl tar anticorrosive paint so that its thickness was 100 to 150 μm after drying, and dried for 3 days under room temperature conditions, thereby forming a paint film.

EXAMPLES 5 to 14

Antifouling paint compositions and paint films were formed similarly to Example 4, except that the resin composition obtained in Preparation Example 4, which was employed in Example 4, was replaced by those obtained in Preparation Examples 5 to 14.

Comparative Example 1

An antifouling paint composition consisting of 30 parts of copper suboxide, 25 parts of Laroflex MP-45 (vinyl chloride/vinyl isopropylether copolymer by BASF German, Ltd.), 25 parts of WW rosin, 1 part of dioctyl phthalate, 1 part of colloidal silica, 15 parts of xylene, and 3 parts of methyl isobutyl ketone was prepared as that containing copper suboxide. The paint composition as obtained was applied onto a steel plate coated with a commercially available vinyl tar anticorrosive paint so that its thickness was 100 to 150 μm after drying, and dried for 3 days under room temperature conditions, thereby forming a paint film.

Comparative Example 2

An antifouling paint composition consisting 50 parts of acrylic resin varnish (a copolymer of 50 parts of methyl methacrylate and 50 parts of n-butyl methacrylate having a weight average molecular weight of 46,000, a number average molecular weight of 18,000 and non-volatile matter concentration of 52.1%), 10 parts of N,N-dimethyldichlorophenylurea, 2,4,5,6-tetrachloroisophthalonitrile, 1 part of dioctyl phthalate, 1 part of colloidal silica, 10 parts of red oxide and 18 parts of xylene was employed to prepare an evaluation test plate similarly to comparative example 1.

Comparative Example 3

180 parts of n-butyl isocyanate were added to 688 parts of a 2-mole ε-caprolactone adduct of 2-hydroxyethyl acrylate and reacted for 4 hours while maintaining a reaction temperature at 70° C. by cooling, to obtain Monomer A.

100 parts of methylisobutylketone were added into a four-necked flask with nitrogen inlet and a mechanical stirrer and maintained at 110° C. A homogenous solution of 200 parts of Monomer A, 150 parts of styrene, 80 parts of hydroxyethyl acrylate, 15 parts of acrylic acid, 40 parts of methylisobutylketone, 40 parts of t-dodecylmercaptane, and 8 parts of 2,2'-azobis-(2,4-dimethylpentane nitrite) was added dropwise into the flask over 3 hours and then heated to 115° C. to react for 2 hours. The obtained polymer is referred to as Polymer A.

7 parts of 3-iodo-2-propynylbutylcarbamate, 15 parts of N,N-dimethyldichlorophenylurea, 5 parts of red iron oxide, 8 parts of xylene, 3 parts of n-butanol, and 2 parts of organic bentonite were added to and dispersed in 60 parts of Polymer A. Then 20 parts of Cymel 303 (by American Cyanamide Co.), and 0.5 part of methane sulfonic acid were added to the mixture. The resulting paint composition was applied onto a steel plate coated with a commercially available vinyl tar anticorrosive paint so that its thickness was about 120 μm in average after drying, dried for one hour under room temperature conditions and then baked at 150° C. for 20 minutes.

Comparative Example 4

7 parts of 3-aminopropanol and 0.02 part of litharge were added to 180 parts of ε-caprolactone and reacted for 18 hours at 240° C. under nitrogen atmosphere, to prepare Polymer B.

30 parts of methyl methacrylate, 40 parts of styrene, 15 parts of allyl methacrylate, 15 parts of n-butyl acrylate, and 1.5 parts of α,α'-azobisisobutyronitrile were added dropwise to 100 parts of xylene over 3 hours while maintaining a temperature of the mixture at 110° C. and then the temperature of the mixture was maintained for 2 hours. 12 parts of tributoxysilane (HOSi(OC$_4$H$_9$)$_3$) was added to and reacted with the mixture for one hour in the presence of a palladium catalyst, to prepare Polymer C.

The resulting solutions of Polymer B and Polymer C were mixed with each other in a weight ratio of 2:1 to prepare Polymer D.

35 parts of toluene, 10 parts of 3-iodo-2-propynylbutylcarbamate, 5 parts of p-nonylphenol, 3 parts of n-butanol, 4 parts of red iron oxide, and 3 parts of organic bentonite were added to and mixed with 40 parts of Polymer D. The resulting paint composition was applied onto a steel plate coated with a commercially available vinyl tar anticorrosive paint so that its thickness was about 130 μm in average after drying, dried for one hour under room temperature conditions and then baked at 150° C. for 20 minutes.

Comparative Example 5

80 parts of the resin obtained in Preparation Example 1, 35 parts of xylene, and 15 parts of titanium oxide were mixed with each other. The mixture was applied onto a steel plate coated with a commercially available vinyl tar anticorrosive paint so that its thickness was about 120 μm in average after drying, and dried for 3 days under room temperature conditions, thereby forming a paint film.

<Measurement of Gel Fraction>

Gel fractions of the binder resin compositions employed in Examples 1 to 14 and Comparative Examples 1 to 5 were measured. For each of Examples 1 and 2, the mixture of 80 parts of the resin obtained in Preparation Example 1 or 2 and 1 parts of Coronate HX was evaluated. For each of Examples 3 to 14, the resin obtained in corresponding Preparation Example was evaluated. For Comparative Examples 1 and 2, Laroflex MP-45 and the employed acrylic resin were evaluated respectively. For Comparative Example 3, the mixture of 60 parts of Polymer A, 20 parts of Cymel 303, and 0.5 part of methane sulfonic acid was evaluated. For Comparative Example 4, Polymer D was evaluated. For Comparative Example 5, the resin obtained in Preparation Example 1 was evaluated.

The sample resin compositions were heated at 150° C. for three hours to be cured and/or evaporate their solvents. 3 g of each resulting resins was extracted with 60 g of a mixed solvent of toluene and methylethylketone of 1:1 by weight under reflux for four hours using a Soxhlet extractor. The weight of the residue after extraction was measured and the value of gel fraction (%) of each sample was calculated as a ratio of the residue weight to the initial weight of the sample resin.

Table 3 shows the results.

TABLE 3

|  | Gel Fraction (%) |
|---|---|
| Example 1 | 2 |
| Example 2 | 2 |
| Example 3 | 0 |
| Example 4 | 0 |
| Example 5 | 0 |
| Example 6 | 0 |
| Example 7 | 0 |
| Example 8 | 0 |
| Example 9 | 0 |
| Example 10 | 0 |
| Example 11 | 0 |
| Example 12 | 0 |
| Example 13 | 0 |
| Example 14 | 0 |
| Comparative Example 1 | 0 |
| Compartive Example 2 | 0 |
| Comparative Example 3 | 98 |
| Comparative Example 4 | 45 |
| Comparative Example 5 | 0 |

<Evaluation of Antifouling Performance>

The paint films obtained in Examples 1 to 14 and comparative examples 1 to 5 were submerged in sea water of 1 m in depth continuously for two years, and subjected to evaluation of antifouling performance. The evaluation was made in the following five stages:

○: having no adhesion of organisms other than small amounts of slimy organisms

○-Δ: having areas of less than 5 percent with adhesion of large animals/plants other than slimy organisms Δ: having areas of 5 to 20 percent with adhesion of large animals/plants other than slimy organisms Δ-X : having areas of 20 to 50 percent with adhesion of large animal/plants other than slimy organisms X: having areas of at least 50 percent with adhesion of large animals/plants other than slimy organisms Table 4 shows the results.

TABLE 4

| | Antifouling Performance | | | | |
|---|---|---|---|---|---|
| | 1 Month | 3 Months | 6 Months | 1 Year | 2 Years |
| Example 1 | ○ | ○ | ○ | ○ | ○-Δ |
| Example 2 | ○ | ○ | ○ | ○ | ○-Δ |
| Example 3 | ○ | ○ | ○ | ○ | ○ |
| Example 4 | ○ | ○ | ○ | ○ | Δ |
| Example 5 | ○ | ○ | ○ | ○ | Δ-x |
| Example 6 | ○ | ○ | ○ | ○ | ○ |
| Example 7 | ○ | ○ | ○ | ○ | Δ |
| Example 8 | ○ | ○ | ○ | ○-Δ | ○-Δ |
| Example 9 | ○ | ○ | ○ | ○ | ○ |
| Example 10 | ○ | ○ | ○ | ○ | ○ |
| Example 11 | ○ | ○ | ○ | ○ | ○ |
| Example 12 | ○ | ○ | ○ | ○ | ○-Δ |
| Example 13 | ○ | ○ | ○ | ○ | ○-Δ |
| Example 14 | ○ | ○ | ○ | ○ | ○ |
| Comparative Example 1 | ○ | ○ | ○ | ○ | Δ |
| Comparative Example 2 | ○ | Δ | x | x | x |
| Comparative Example 3 | ○ | x | x | x | x |
| Comparative Example 4 | ○ | x | x | x | x |
| Comparative Exampel 5 | Δ | x | x | x | x |

As clearly understood from Table 4, the paint film employing the resin composition according to each of Examples according to the present invention has antifouling performance which is substantially similar to that of a ship bottom antifouling paint containing copper suboxide. Thus, the antifouling paint composition employing the inventive biodegradable resin exhibits excellent antifouling effect for a long-term.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An antifouling paint composition comprising:

a binder resin composition containing a biodegradable resin being obtained by polymerizing a cyclic lactone compound with at least two active hydrogen groups of a compound containing said at least two active hydrogen groups in one molecule, said binder resin composition being prepared so that a gel fraction after heating is not more than 5% by weight: and an antifouling additive being mixed with said binder resin composition in a weight ratio of said binder resin composition to said antifouling additive from 1:2 to 7:1.

2. The antifouling paint composition in accordance with claim 1, wherein said biodegradable resin has a number average molecular weight of from about 9000 to 563,000.

3. The antifouling paint composition in accordance with claim 1, wherein said biodegradable resin has a number average molecular weight of from about 170,000 to 563,000.

4. The antifouling paint composition in accordance with claim 1, wherein said compound containing active hydrogen groups is a compound of one or at least two elements selected from the group consisting of saccharides, polyamino acids, glycerine, monoglycerides of glycerine and natural fatty acids having 12 to 24 carbon atoms, and polymers of ethylenic unsaturated monomers having at least two carboxyl, hydroxyl, or amino groups, and polyvinyl alcohols.

5. The antifouling paint composition in accordance with claim 1, wherein said cyclic lactone compound is expressed in the following general formula(s) (I) and/or (II):

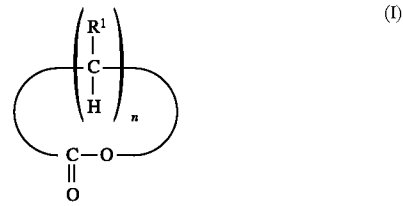

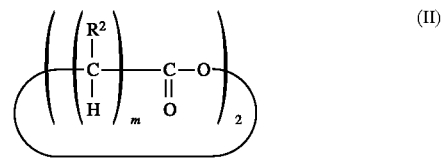

wherein n represents an integer of 2 to 12, m represents 1 or 2, and $R^1$ and $R^2$ represent hydrogen atoms, methyl groups or ethyl groups.

6. The antifouling paint composition in accordance with claim 1, wherein said cyclic lactone compound is ε-caprolactone.

7. The antifouling paint composition in accordance with claim 4, wherein said polymer of ethylenic unsaturated monomer is acrylic resin having at least two carboxyl, hydroxyl, or amino groups.

* * * * *

UNITED STATES PATENT AND TRADEMARK OFFICE
CERTIFICATE OF CORRECTION

PATENT NO.    : 5,883,156
INVENTOR(S)  : K. Fukuda, et. al.
DATED         : March 16, 1999

It is certified that error appears in the above-identified patent and that said Letters Patent is hereby corrected as shown below:

On the Title page, item [54] and col. 1, line 2, should read – BIODEGRADABLE RESIN COMPOSTION AND ANTIFOULING PAINT COMPOSITION --.

Signed and Sealed this

Twenty-seventh Day of July, 1999

*Attest:*

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,883,156
DATED : March 16, 1999
INVENTOR(S) : K. Fukuda, et al.

It is certified that error appears in the above-identified patent and that said Letters Patent is hereby corrected as shown below:

On the title page, Item [54] and col. 1, line 2, should read -- BIODEGRADABLE RESIN COMPOSITION AND ANTIFOULING PAINT COMPOSITION--.

This Certificate supercedes certificate of correction issued July 27, 1999.

Signed and Sealed this

Fifteenth Day of August, 2000

Attest:

Q. TODD DICKINSON

*Attesting Officer*  *Director of Patents and Trademarks*